United States Patent
Posmyk et al.

(10) Patent No.: US 10,968,394 B2
(45) Date of Patent: Apr. 6, 2021

(54) PROCESS FOR CONVERSION OF PLASTICS INTO FUEL

(71) Applicant: SUEZ GROUPE, Paris la Défense (FR)

(72) Inventors: Andrzej Posmyk, Bristol (GB); James Gray, Bristol (GB); Jonathan Hall, Bristol (GB)

(73) Assignee: SUEZ GROUPE, Paris la Défense (FR)

( * ) Notice: Subject to any disclaimer, the term of this patent is extended or adjusted under 35 U.S.C. 154(b) by 0 days.

(21) Appl. No.: 16/309,870

(22) PCT Filed: Jun. 19, 2017

(86) PCT No.: PCT/EP2017/064960
§ 371 (c)(1),
(2) Date: Dec. 13, 2018

(87) PCT Pub. No.: WO2017/220504
PCT Pub. Date: Dec. 28, 2017

(65) Prior Publication Data
US 2019/0177620 A1    Jun. 13, 2019

(30) Foreign Application Priority Data

Jun. 23, 2016 (EP) ..................................... 16020246

(51) Int. Cl.
*C10B 53/07* (2006.01)
*B01D 3/06* (2006.01)
(Continued)

(52) U.S. Cl.
CPC ................ *C10B 53/07* (2013.01); *B01D 3/06* (2013.01); *B01D 3/163* (2013.01); *B01D 3/225* (2013.01);
(Continued)

(58) Field of Classification Search
CPC ........... C10B 47/18; C10B 53/07; B01D 3/06; B01D 3/163; B01D 3/225; B01D 3/32;
(Continued)

(56) References Cited

U.S. PATENT DOCUMENTS

| 5,738,025 A | 4/1998 | Tachibana |
| 6,011,187 A | 1/2000 | Horizoe et al. |

(Continued)

FOREIGN PATENT DOCUMENTS

| EP | 1 577 366 A2 | 9/2005 |
| GB | 1 534 474 A | 12/1978 |

(Continued)

OTHER PUBLICATIONS

Fair, J.R. et al (1984) "Section 18: Liquid-Gas Systems" in Perry's Chemical Engineers' Handbook, 6th edition, McGraw-Hill, 2240 pgs.*

(Continued)

*Primary Examiner* — Brian A McCaig
(74) *Attorney, Agent, or Firm* — BakerHostetler

(57) ABSTRACT

A process for thermal cracking of a feedstock of plastic materials, in particular waste materials, includes the steps of melting the feedstock, conveying melted feedstock in a pyrolysis chamber where the melted feedstock is heated in a substantially oxygen purged environment, to convert it into pyrolysis gases, the process further comprising the steps of: driving pyrolysis gases from the pyrolysis chamber into a tray reflux column comprising a partial condenser at its upper extremity, returning pyrolysis gases condensed in the tray reflux column into the pyrolysis chamber, distilling pyrolysis gases exiting the partial condenser of the reflux column, to provide one or more fuel products.

14 Claims, 4 Drawing Sheets

(51) Int. Cl.
  *B01D 3/32* (2006.01)
  *C10G 1/10* (2006.01)
  *C10B 47/18* (2006.01)
  *B01D 3/22* (2006.01)
  *B01D 3/16* (2006.01)
  *B01D 5/00* (2006.01)
  *C10G 1/02* (2006.01)
  *C10G 1/06* (2006.01)
  *C10L 1/04* (2006.01)

(52) U.S. Cl.
  CPC ............ *B01D 3/32* (2013.01); *B01D 5/0009* (2013.01); *B01D 5/0063* (2013.01); *C10B 47/18* (2013.01); *C10G 1/02* (2013.01); *C10G 1/06* (2013.01); *C10G 1/10* (2013.01); *C10L 1/04* (2013.01); *C10G 2300/1003* (2013.01); *C10L 2200/0461* (2013.01); *C10L 2290/02* (2013.01); *C10L 2290/146* (2013.01); *C10L 2290/543* (2013.01); *Y02P 20/143* (2015.11)

(58) Field of Classification Search
  CPC ....... B01D 5/0009; B01D 5/0063; C10L 1/04; C10G 1/02; C10G 1/06; C10G 1/10; Y02P 20/143
  See application file for complete search history.

(56) References Cited

U.S. PATENT DOCUMENTS

| | | |
|---|---|---|
| 2007/0007174 A1 | 1/2007 | Strack et al. |
| 2009/0321317 A1 | 12/2009 | Widmer et al. |
| 2013/0068854 A1* | 3/2013 | Miracle .................. A47G 21/18 239/33 |

FOREIGN PATENT DOCUMENTS

| | | |
|---|---|---|
| WO | 79/00625 A1 | 9/1979 |
| WO | 2011/077419 A1 | 6/2011 |

OTHER PUBLICATIONS

York, O.H. et al (1963) Chemical Engineering Progress, 59, 6, 2-7.*
Kister, H.Z. et al. (2007) Perry's Chemical Engineers' Handbook, 8th edition, McGraw-Hill, 2704 pgs.*

* cited by examiner

PROCESS FOR CONVERSION OF PLASTICS INTO FUEL

CROSS-REFERENCE TO RELATED APPLICATIONS

This application is a National Stage of International patent application PCT/EP2017/064960, filed on Jun. 19, 2017, which claims priority to foreign European patent application No. EP 16020246.1, filed on Jun. 23, 2016, the disclosures of which are incorporated by reference in their entirety.

The present invention relates to processes for converting plastic materials, in particular waste plastic materials, into liquid hydrocarbons, particularly diesel fuels.

Pyrolysis (or thermolysis) is a known process whereby plastic material is converted into liquid hydrocarbons by thermal cracking at a temperature between 400 and 480° C. in the absence of oxygen or air in a batch reactor.

Plastic feedstock maybe pure polymeric plastic waste, mixed plastic waste, including possible soiling by sticky label material, residual contents . . . . It is known that plastic wastes coming from garbage typically contain around 70% by weight of polyolefins, such as polyethylene and polypropylene, about 15% of styrene polymers, about 10% of polyvinylchloride and 5% of other plastics that maybe polyurethane, polyester, polyamide, . . . . Several cleaning and sorting steps are implemented upstream of thermal conversion processes in order to obtain a feedstock mainly consisting in polyolefins, with minor amount of polystyrene and as low content as possible of PVC.

Plastic feedstock is then typically mixed and pre-melted at a temperature around 300 to 350° C., typically by means of an extrusion screw equipped with heating system, and possibly an inert purging gas (such as nitrogen) system.

Pre-melted mixture is then conveyed to the pyrolysis chamber that is filled under inert gas purging to ensure removal of oxygen. Pyrolysis process is a semi batch process, and feeding of the pyrolysis chamber is stopped when the desired amount is present in the pyrolysis chamber. The mixture is then heated up to a temperature typically between 300 and 900° C., while being stirred, and is converted into a gaseous phase that is continuously extracted from the pyrolysis chamber. Carbonaceous char is also being formed as a byproduct in the pyrolysis chamber. Once the pyrolysis of plastic material is completed, it is necessary to wait until cooling of the char until it can be extracted and removed from the pyrolysis chamber, so that the chamber can be used again for subsequent batches.

The gaseous mixture at the exit of the pyrolysis chamber typically contains a mixture of hydrocarbon compounds comprising from 1 to 30 or even more carbon atoms. In order to obtain a hydrocarbon mixture that is suitable for use as a fuel, typically diesel fuel, it is necessary to apply some post treatments to the raw product obtained after pyrolysis step.

On the one hand, the flash point of the mixture needs to be increased by removing lighter fractions, and on the other hand, heavier fractions must also be removed in order to reduce final boiling point of the mixture, according to the specifications of fuel products.

EP 1 577 366 discloses a process for the thermocatalytic conversion of waste plastic materials into reusable fuels, especially diesel fuel, comprising a pyrolysis step of the plastic materials, where the exit gases from the pyrolysis chamber is directly fed to a catalytic converter where the molecular structure of the gases are altered in structure and form, and then transferring resulting gases to one or more condensers to distill and cool gases into several fractions.

The direct transfer of exit gases from pyrolysis chamber to catalytic conversion, with heavy products and char likely to be entrained by the exit gases, may cause fouling of the catalysts.

US 20090321317 discloses a process for processing a mixture of plastics and organic fluids such as crude oil, cooking oil, fats or the like wherein the mixture is melted around. Impurities and non-melted materials are removed, and the liquid melt is transferred to a thermal cracking reactor for conversion of polymer compounds into a gaseous phase. The gaseous phase maybe transferred to a contra-flow distillation column, which is a packed column containing metal body filling to increase reaction surface, and optionally a partial condenser, where long chain hydrocarbon (containing more than 24 carbon atoms) are condensed and all sent back to the cracking reactor, whereas the gaseous mixture of compounds comprising from 1 to 22 carbon atoms is condensed in a cooler consisting of a quenching tower.

This process may have several drawbacks when implemented in an industrial scale. First, removal and discharge of impurities and non-melted would extract large quantities of materials and decrease the yield of the process, and would require a specific technology. Secondly, no char formation is mentioned, and the process does not take into account the problem of entrained solids passing forward the pyrolysis chamber and fouling downstream equipment, in particular the packed contra flow distillation column, which would cause major downtime.

U.S. Pat. No. 5,738,025 discloses a process for thermal cracking of waste plastics where pre melted mixture of waste plastics are fed to a pyrolysis reactor where it is heated at a temperature between 350 to 450° C. to be converted into vaporous products, that are introduced into an atmospheric fractional distillation column and a condenser in order to separate volatile compounds from high boiling products. Volatile compounds are sent to an incinerator and a scrubber, whereas part of the bottom products are sent back to the cracking reactor, and the other part are fed to a catalytic converter to produce the desired fractioning and rearrangement of hydrocarbons. The resulting products are then sent to a receiver tank where the light products are separated from the liquid hydrocarbons.

This process is composed of two distinct cracking steps, including a catalytic cracking, which is rather complex and generates additional costs. The problem of char entrainment downstream of the pyrolysis, and especially in the catalytic converter, is not considered. The condenser downstream of the fractional distillation column is not a partial condenser. All char entrained by the pyrolysis gases is then likely to be present in the bottom distillation products sent to the catalytic converter, thus causing fouling of the catalyst.

WO2011077419 discloses a process for treating waste plastics to provide fuel products, where plastic materials are melted and then pyrolysed in an oxygen-free atmosphere to provide pyrolysis gases. The pyrolysis gases are directed into a contactor equipped with plates slopped downwardly and surrounded by a cooling jacket, in order to allow hydrocarbon vapor composed to flow up and condensed heavy long chained to flow back in the pyrolysis chamber for further thermal degradation. Gases exiting from the contactor are fed to an atmospheric distillation column for a first separation step of the lighter compounds. A second distillation step is required for further elimination of lightest and heavier compounds.

In this process, the air cooling jacket surrounding the contactor does not provide an efficient enough cooling.

Moreover, the design of the plates elements sloped downwardly do not promote enough turbulence in the contactor. As a consequence, contactor may allow long chain compounds and char to be entrained with pyrolysis gas, thus causing fouling of the atmospheric distillation column, especially on the packing elements of the column. Moreover, the presence of long chain compounds in the alimentation of the distillation column causes an increase in the final boiling point of the final liquid hydrocarbons, which cannot be completely corrected by the subsequent vacuum distillation step unless a recycling of heavies (waxes) from the atmospheric distillation to the pyrolysis is implemented, causing wax fouling, wax accumulation in the pyrolysis chamber and subsequent temperature control problem in said pyrolysis step.

There is therefore a need for thermal conversion processes of plastics that can process mixed waste feedstocks, with limited fouling problems, in order to be able to be implemented at an industrial scale, with limited maintenance problems.

Surprisingly, we have found that liquid hydrocarbons suitable for use as diesel fuel could be obtained from pyrolysis process of mixed plastic waste in a simple manner, by positioning a tray reflux column at the exit of the pyrolysis chamber. The gases exiting the partial condenser of the reflux column can be further condensed and sent to a flash distillation step. The final product is a liquid hydrocarbon mixture useable as fuel, in particular diesel fuel.

Said process avoids the use of catalytic conversion steps, and other distillations steps performed in packed columns. Fouling problems due to entrainment of char downstream of the pyrolysis chamber are reduced, and downtimes are limited. The process according to the invention has reduced complexity, as well as investment and operating costs.

DESCRIPTION OF THE INVENTION

The present invention is related to a process for thermal cracking of a feedstock of plastic materials, in particular waste materials, comprising the steps of melting the feedstock, conveying melted feedstock in a pyrolysis chamber (2) where said melted feedstock is heated in a substantially oxygen purged environment, to convert it into pyrolysis gases, said process further comprising the steps of:
  driving pyrolysis gases from the pyrolysis chamber (2) into a tray reflux column (3) comprising a partial condenser (3a) at its upper extremity,
  returning pyrolysis gases condensed in the tray reflux column into the pyrolysis chamber (2),
  distilling pyrolysis gases (4) exiting the partial condenser of the reflux column, to provide one or more fuel products.

Substantially oxygen purged environment means inerted atmosphere, meaning that the pyrolysis chamber is purged with an inert gas, preferentially nitrogen. Typically, the oxygen content of the gaseous atmosphere of the pyrolysis chamber would contain less than 1.5%, or preferably less than 0.5% weight percentage of oxygen.

Pyrolysis gases are continuously extracted from the pyrolysis chamber so as to maintain a pressure between 250 and 300 millibars, typically around 270 millibars in the pyrolysis chamber and directly fed to the tray reflux column.

The distillation of pyrolysis gases enables separation between non-condensable gases, light hydrocarbons and heavy hydrocarbons; Non condensable gases are typically hydrogen, carbon monoxide and dioxide, methane, ethane, and more generally hydrocarbons having between 1 to 4 carbon atoms. Light hydrocarbons are typically hydrocarbons having boiling point below 150° C. under atmospheric pressure or comprising less than 9 carbon atoms, whereas heavy hydrocarbons means hydrocarbons having boiling point between 140° C. or 150° C. and 380° C., under atmospheric pressure or comprising between 9 and 25 carbon atoms.

Typically, heavy products obtained from distillation of pyrolysis gases (4) are suitable for use in diesel blendings.

The tray reflux column (3) according to the invention is a column equipped with crossflow trays that are designed to ensure optimum contact between rising vapor and downward flowing liquid, and even heat distribution in the cross section of the column, therefore maximizing heat/mass transfer efficiency and proper composition of the pyrolysis gases exiting the partial condenser positioned at its upper extremity. The partial condenser is positioned in a way that condensed products will directly flow down the reflux column by gravity.

Trays of the reflux column may be stainless steel trays. Trays are designed for liquid vapor crossflow. They are typically horizontal trays with a surface close to the internal cross-section of the reflux column.

Preferentially, each tray is provided with one down comer (17) to allow the liquid to pass down the stages. To promote good scrubbing of entrained char, and thus prevent fouling of the column and downstream process, it is important that all trays are properly fed with liquid. Down comers ensure proper liquid hold up on the trays.

In the process according to the invention, good contact between vapor and liquid not only enables longer chain hydrocarbons to be efficiently condensed and sent back to pyrolysis chamber, but also ensures that the vapor leaving the reflux column is substantially free of entrained char particle, thus reducing fouling of downstream devices.

Typically, reflux column of the process according to the invention comprise a minimum of 2, preferably a minimum of 3 such trays.

A partial condenser is a heat exchanger that will condense part of the head products from the reflux column where they are sent back and let part of the head products exit in vapor form. The partial condenser (3a) at the top of the reflux column (3) condenses longer chain hydrocarbons that are sent back to the column and the pyrolysis chamber, and allows lighter hydrocarbons (typically containing from 1 to 25 carbon atoms), to be sent to downstream steps of the process. The partial condenser (3a) is positioned at the upper extremity of the reflux column (3), meaning that it is positioned above all trays of the column, in a way that condensed products will directly flow down the reflux column by gravity. The partial condenser may either be inside the reflux column, or directly connected to it.

Typically, pyrolysis gases entering the reflux column would be at a temperature between 380° C. and 450° C., and head gaseous products exiting the partial condenser would be at a temperature between 250 and 280° C.

Typically, in the process according to the invention, 10% to 30% in weight of the head products of the reflux column will be condensed and sent back to the reflux column, whereas the remaining part will exit the partial condenser in the form of vapor. This is achieved through efficient heat transfer from the partial condenser and over the reflux column height, due to the trays.

This ensures optimum properties of the final hydrocarbon products, and optimal control of char entrainment downstream of the pyrolysis, due to efficient char scrubbing by down flowing liquid.

In a preferred embodiment of the process according to the invention, the tray reflux column comprises valve trays (16). Crossflow trays of the reflux column may be valve trays, equipped with anti-fouling fixed valve (apertures with cap on top) designed for vapor progression upwards through the apertures. Valve trays are preferred for their superior ability to provide efficient char scrubbing by down flowing liquid.

In a preferred embodiment of the process according to the invention, the upper tray of the reflux column is a chimney tray (15). A chimney tray is a tray designed for distribution of liquid to a lower part for the column. No gas liquid exchange occurs in this kind of tray, ensuring no entrainment, or limited entrainment of liquid in the exit gases from the reflux column. Typically, a chimney tray is a tray with no apertures except a chimney comprising horizontal tubes allowing vapor to rise, with a plate disposed over their upper extremity, and equipped with a down comer for down flowing of the liquid phase.

Preferentially, in the process according to the invention, the tray reflux column comprises a demister pad (14) between the upper tray and the partial condenser. Final retention of the finest char particle is thus made through the demister, typically composed of stainless steel mesh, and placed above the chimney tray of the tray reflux column. Said demister is ideally designed to be easily removed for cleaning.

In a preferred embodiment of the process according to the invention the partial condenser of the reflux column is a tube heat exchanger (13). The tube heat exchanger provides optimal cooling surface, in order to achieve the desired reflux rate for good product quality and char scrubbing.

In a preferred embodiment, in the process according to the invention, the partial condenser of the reflux column is using water or mineral oil as cooling media. The water may be chilled water, where glycol maybe optionally added, entering the condenser at a temperature around 5° C. Mineral oil, for example thermal oil, would be preferred because of their higher boiling point that avoids vaporization within the tubes and subsequent damages to the tubes. An example of such thermal oil is Therminol 66 commercialized by Therminol.

In a preferred embodiment, the process according to the invention comprises the step of injecting liquid water or hydrocarbons at the bottom of the reflux column (3).

This liquid injection is used to complement the cooling capacity of the partial condenser. This will not only improve cooling, but also agglomerate char particles, which will be more easily retained in the liquid phase and in the demister of the reflux column. Liquid water, typically at a temperature between 5 and 20° C., may be injected. Liquid water may be replaced by liquid hydrocarbons, for example heavy hydrocarbons obtained after distillation of pyrolysis gases in step (c) of the process according to the invention. Liquid hydrocarbons are preferred because they will have less expansion than water, and will cause less perturbations of pressure in the reflux column.

Said liquid injection may be periodical or continuous. In the case of a periodical injection, it may be triggered when the temperature of the pyrolysis gases exiting the partial condenser of the reflux column exceeds a certain threshold.

In an embodiment, the process according to the invention comprises the step of condensing pyrolysis gases (4) exiting the partial condenser (3a) of the reflux column (3) in a condenser (7a) prior to distilling said gases.

In a preferred embodiment of the process according to the invention, the distillation of gases exiting the partial condenser of the tray reflux column is a flash distillation.

Flash distillation is a simple unit separation and refers to the partial vaporization of a liquid stream undergoing a reduction in pressure when being distributed in a flash vessel or flash drum. The vaporized phase is enriched in lighter compounds, and the liquid phase contains the heavier compounds. A flash distillation step has the advantage of being a very simple process, which is performed in a flash vessel (or flash column) containing a minimum of internal elements, having a majority of its internal volume empty, thus reducing fouling risks, as compared, for example, to a packed distillation column that is completely filled with internals. Typically, a flash distillation is a one-step separation process, as opposed to multistage distillation processes carried out in distillation columns having the majority of their internal volume filled with interfacial units such as packing elements.

In an embodiment, the flash distillation step of the process according to the invention comprises condensation of the vapor phase (7b) at the head of the flash distillation column (7) and partial recirculation of condensed light hydrocarbons (10b) in the upper part of the flash distillation column. Upper part of the flash distillation column hereby means located in the upper sixth of the height of said column, and above any potential internals being present in said column.

In an embodiment, the flash distillation step of the process according to the invention comprises extracting a hydrocarbon fraction in a tray (7d) positioned in the upper medium part of the flash distillation column and recirculating said hydrocarbon fraction, preferentially below the extraction level, preferentially by spraying said hydrocarbon fraction. Upper medium part hereby means located above the half height of the column, preferentially in the top third of the column.

In an embodiment, the flash distillation step of the process according to the invention comprises partial recirculation of liquid heavy hydrocarbons (7c) obtained at the bottom of the flash column, in the lower part of the flash column, preferentially by spraying said heavy fraction. Lower part means located in the lower third of the height of the column.

These recirculation steps allow better temperature control of the flash vessel.

The spraying of liquid hydrocarbons will also help absorb entrained and forming tars, and remaining entrained char particles, and concentrate them in the reboiler system at the bottom of the flash distillation column, where they may be removed more easily.

In an embodiment of the process according to the invention, part of the heavy liquid hydrocarbons obtained at the bottom of the flash distillation column may be recirculated into the reflux column.

The present invention is also related to an apparatus for the thermal cracking of a feedstock of plastic materials, in particular waste plastic materials, according to the above exposed process, and comprising:
 a mixing and melting device (1),
 a pyrolysis chamber (2),
 a reflux column (3) connected to the gas exit of the pyrolysis chamber (2),
where the reflux column (3) comprises crossflow trays and a partial condenser (3a) at its upper extremity.

Crossflow trays are trays designed to ensure gas liquid contact and heat transfer in the column. Typically, they are horizontal trays, with an area close to the cross section of the column. Partial condensers are as described above.

In a preferred embodiment of the apparatus according to the invention, crossflow trays comprise down comers (17). Down comers are pipes guiding liquid flow from an upper tray to a lower tray, and will ensure good liquid hold up on each tray and thus, good scrubbing of any char entrained with the gaseous phase. Typically, down comers cross section area account for less than 20% of the tray area.

In a most preferred embodiment of the apparatus according to the invention crossflow trays of the reflux column are valve trays (16). Crossflow trays maybe for example valve trays, sieve trays, bubble cap trays. Valve trays are preferred for their superior anti fouling action.

In an embodiment of the apparatus according to the invention, the upper tray of the reflux column is a chimney tray (15). A chimney tray is a tray designed for distribution of liquid to the lower part for the column. No gas liquid exchange occurs in this kind of tray, ensuring no entrainment, or limited entrainment of liquid in the exit gases from the reflux column. Typically, a chimney tray is a tray with no apertures except a chimney comprising horizontal tubes allowing vapor to rise, with a plate disposed over their upper extremity, and equipped with a down comer for down flowing of the liquid phase.

In an embodiment of the apparatus according to the invention, a demister pad (14), preferentially a removable demister pad is located at the top of the tray reflux column, below the partial condenser. Final retention of the last char particle can be made through a demister composed of stainless steel mesh, and placed above the chimney tray of the reflux column. Said demister is ideally designed to be easily removed for cleaning;

In an embodiment of the apparatus according to the invention, the partial condenser (3a) of the reflux column (3) is a tube heat exchanger. Said heat exchanger is preferentially using chilled water or thermal oil, more preferentially thermal oil, as a cooling media.

In an embodiment of the apparatus according to the invention, the reflux column further comprises a liquid injection system (19) at the bottom of the column.

In a preferred embodiment, the apparatus according to the invention comprises a flash distillation column (7) downstream of the partial condenser of the tray reflux column.

In a preferred embodiment, the apparatus according to the invention comprises a condenser (7a) positioned between the partial condenser (3a) of the tray reflux column (3) and the flash distillation column (7).

In an embodiment of the apparatus according to the invention, the flash distillation column (7) comprises a condenser (10a) and a reflux drum (10) at its upper extremity, and a recirculation loop for recirculating condensed light hydrocarbons (10b) of the reflux drum in the upper part of the flash distillation column.

In an embodiment of the apparatus according to the invention, the flash distillation column comprises a tray (7d) for extracting liquid hydrocarbon fraction in the upper medium part of the flash distillation column, said tray being connected to a recirculation loop for recirculating said hydrocarbon fraction into the flash distillation column, preferentially below the extraction level, said recirculation loop being preferentially equipped with spray nozzles (7e) for spraying the liquid in the flash distillation column.

In an embodiment of the apparatus according to the invention, the flash distillation column comprises a recirculation loop for liquid heavy hydrocarbons (7c) obtained at the bottom of the flash distillation column, said recirculation loop being preferentially equipped with spray nozzles (7e) for spraying the liquid in the flash distillation column.

Spraying of recirculated liquids will ensure tar dissolution and concentration of said tar in the bottom products of flash distillation column. This way, tar will not cause fouling of the flash vessel or any downstream element, and may be eliminated more easily in the bottom products where it is concentrated. Injection of tar agglomeration additives, either in the liquid feed of the flash distillation column or in the bottom product tank (9) (diesel tank), may help further separation and elimination of tar.

DESCRIPTION OF THE DRAWINGS-EXAMPLE

The invention will be further illustrated from the following description of some embodiments, given by way of example to the drawings in which.

REFERENCE NUMBERS

Figure 1:
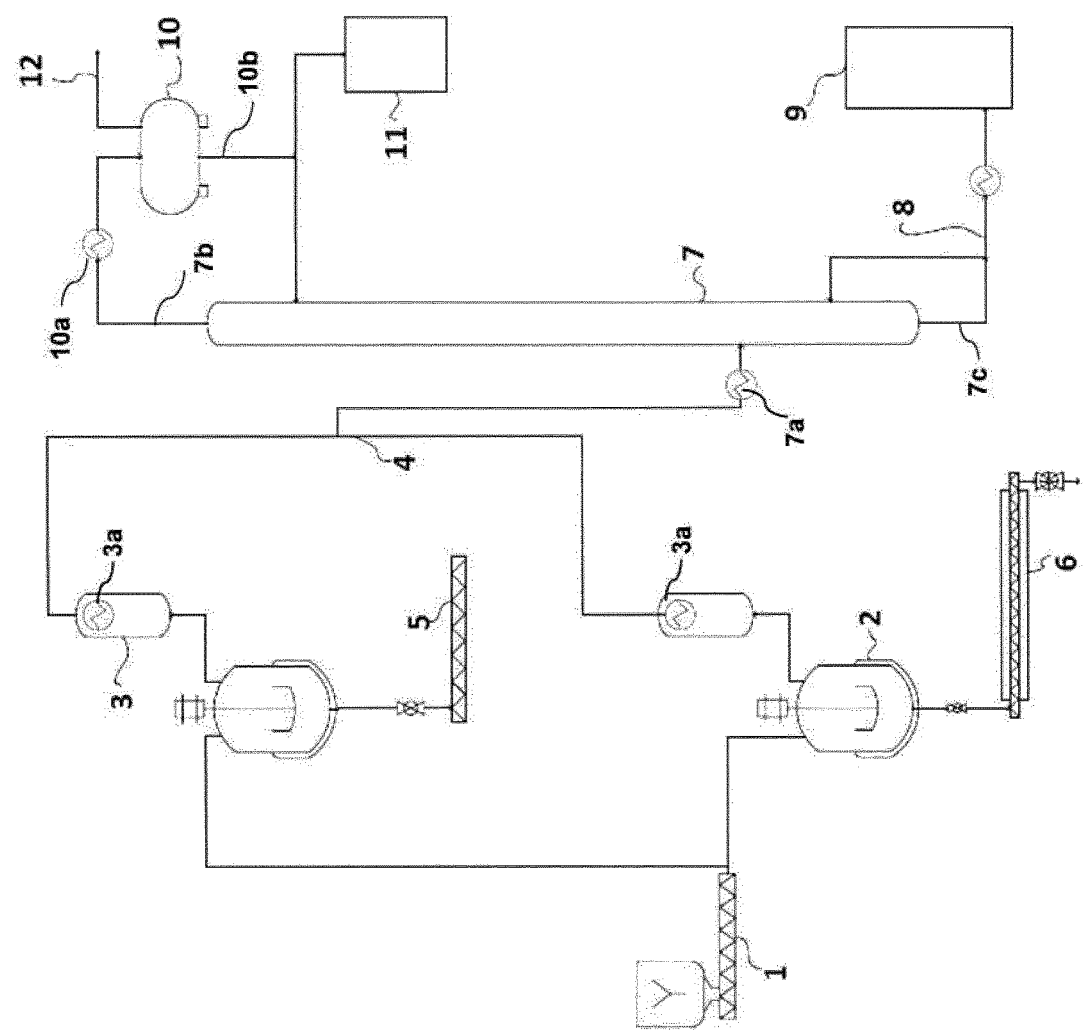
FIG. 1 represents a process diagram for thermal cracking of plastics according to the invention.
Figure 2:
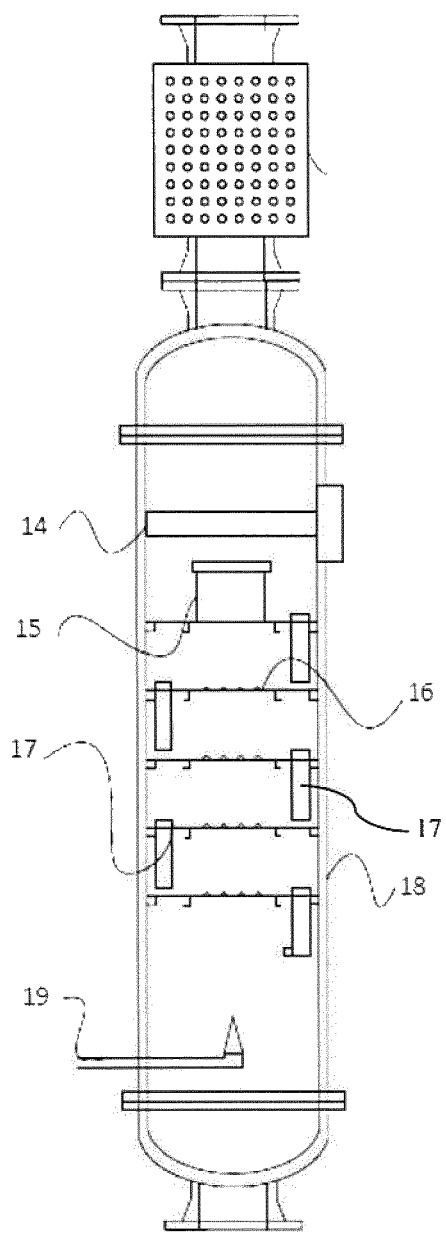
FIG. 2 represents a tray reflux column according to the invention.
Figure 3:
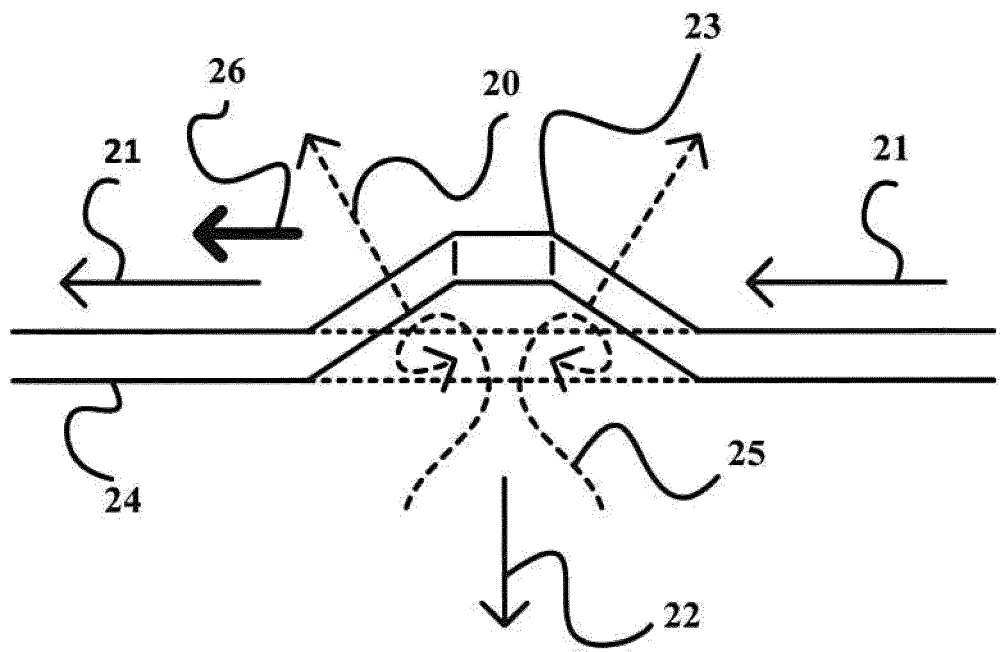
FIG. 3 is a detailed view of a valve in a valve tray of the reflux column, and the effects on vapor/liquid/solid flows around it.

1. Extruder with molten plastic feed to 2 reactors
2. Pyrolysis reactor
3. Tray reflux column
3a. Partial condenser
4. Diesel, light oil and syngas vapors (pyrolysis gases) to flash column
5. Char conveying screw
6. Char cooling screw
7. Flash distillation column
7a. Condenser
7b. Vapor phase at the head of the distillation column
7c. Heavy liquid hydrocarbons obtained at the bottom of the distillation column
7d. Tray for extracting liquid hydrocarbons (light oil tray)
7e. Spray nozzle
7f. Packing elements
8. Diesel offtake
9. Diesel tank
10. Light oil offtake-reflux drum
10a. Condenser
10b. Condensed light hydrocarbons
11. Light oil tank
12. Syngas to scrubber/furnaces
13. Partial condenser (tube heat exchanger)
14. Demister
15. Chimney tray
16. Valve trays
17. Down comer
18. Column
19. Water/liquid hydrocarbon injection
20. Vapor flow upwards through valve
21. Liquid flow horizontally across trays
22. Char solids flow downwards due to eddies in vapour flow
23. Fixed valve with cap
24. Tray
25. Vapor rising upwards hitting underside of cap-causing eddies in flow
26. Char solids flow from washing out of vapor Waste plastic material, typically mainly containing polyolefins, typically between 70% to 90% (weight percentage) of low density polyethylene (LDPE) from 5 to 10% of polypropylene (PP), with minor amounts (typically less than 5% for each) of styrene polymers, polyvinylchloride and minor amounts of other plastics that maybe polyurethane, polyester, polyamide, is dry cleaned and processes into granular or flake form. It is then heated in an extruder (1) at a temperature around 300, and the molten plastic is then fed into the pyrolysis chamber (2). This is done under nitrogen purge, ensuring that no oxygen enters the system. The molten plastic is maintained at a temperature between 300° C. to 400° C. until the pyrolysis chamber is completely fed.

In the pyrolysis chamber (2), the plastic material is heated up to a temperature between 380° C. and 450° C. in a nitrogen purged system under agitation, and this temperature is maintained during the pyrolysis. The melted plastic material is thermally cracked into pyrolysis gases and char formation occurs simultaneously in the pyrolysis chamber.

An industrial installation implementing the process according to the invention will typically contain at least two pyrolysis chambers (2), since the process is a semi batch process. As one pyrolysis chamber is active, char cooking and removal takes place in the other one.

As pyrolysis of the melted plastic is being completed, the load on the agitator increases, showing that char drying is taking place and batch is ending. A cook off cycle of the char may then take place, with further heating of the char above 450° C., to complete drying and remove remaining gases from it.

For safety reasons, dried char then has to be cooled and removed from the pyrolysis chamber in a gas tight environment. Char may for example be carried from the pyrolysis chamber to a screw conveyor unit (5) through air tight valves, said screw conveyor being optionally cooled with an external cooling jacket (6).

While the pyrolysis reaction is ongoing, pyrolysis gases are continuously extracted from the pyrolysis chamber as they rise through the tray reflux column (3) and the partial condenser (3a). Pressure in the pyrolysis chamber is maintained around 270 millibars by controlling the exit valve of the pyrolysis gases, connecting the pyrolysis chamber (2) to the tray reflux column (3).

Part of the pyrolysis gases are condensed in the partial condenser (3a), which is for example tube heat exchanger using chilled water at around 5° C. as a cooling media. These condensed gases fall back into the tray reflux column, first though a chimney tray (15) designed to distribute these condensed liquid product down to the other trays of the column that are valve trays (16)). Liquid transfer from one valve tray to the valve tray below is made through downcomers (17). Valve trays are designed to ensure good contact and heat transfer between condensed liquid falling down and rising pyrolysis gases, so that longer chain hydrocarbon components are efficiently sent back to the bottom of the reflux column, and then back to the pyrolysis chamber for further cracking.

Trays are typically stainless steel trays, in which valves or apertures covered with caps (23), have been provided. These are very effective not only for liquid gas transfer, but also for scrubbing of char particles entrained by the gases by the down flowing liquid. Vapor rising from underneath the tray hit the underside of the cap (23), causing eddies (25) in flow and char to remain on said underside of the cap, where they will be washed off by liquid flowing horizontally (21) across the tray and downward (22). The presence of downcomers (17) ensuring good liquid hold up on the trays also improves efficiency of char scrubbing.

Final retention of the last char particle is made through a demister (14) composed of stainless steel mesh, and placed above the chimney tray of the reflux column. Said demister is ideally designed to be easily removed for cleaning.

Pyrolysis gases (4) exiting the partial condenser (3a) have a temperature between 260 and 280° C. In order to complement the cooling capacity of the partial condenser, some liquid water, typically at a temperature between 5 and 20° C., may be injected at the bottom of the reflux column (19). This will not only improve cooling, but also agglomerate char particles, which will be more easily retained in the liquid phase and in the demister of the reflux column. If water is used, it may be separated and recovered at the bottom of the reflux drum (10) of the flash column. Liquid water may be replaced by liquid hydrocarbons, for example heavy hydrocarbons obtained after distillation of pyrolysis gases exiting the partial condenser. Liquid hydrocarbons are preferred because they will have less expansion in the reflux column (3) and will cause less perturbations of pressure in the reflux column.

Said liquid injection may be periodical or continuous. In the case of a periodical injection, it may be triggered when the temperature of the pyrolysis gases (4) exiting the partial condenser of the reflux column exceeds a certain threshold.

Gases (4) exiting the partial condenser at a temperature between 260 and 280° C., are cooled at a temperature around between 130° C. and 150° C., Condensation and cooling of pyrolysis gases (4) may naturally occur in the piping system of the installation. Preferentially, this is done in a condenser 7a.

The resulting liquid, or more exactly saturated gas liquid mixture, containing hydrocarbons comprising around 1 to 25 carbon atoms, is then fed to a flash distillation column (7) where light fractions are vaporized and the heavier fraction remains liquid.

A reflux drum (10) is provided at the head of the flash vessels. Syngas or non-condensable gases (12) from the reflux drum are sent to scrubbers and furnaces. The liquid part (11) is light oil and water, especially if liquid water injection (19) has happened in the process.

Heavy fractions (diesel oil) are recovered at the bottom of the flash distillation vessel in a diesel tank (11). Further separation step may be implemented on said diesel oil, for example solid separation, tar separation, and optionally a vacuum distillation step to remove lighter fraction and correct flash point.

The flash distillation column is a column where the saturated liquid gas mixture fed after condensation in condenser (7a) undergoes pressure reduction. The flash distillation column is typically operated at a pressure close to atmospheric pressure.

A flash distillation column contains no internals, or very few internal elements, thus reducing fouling risks. According to the present invention, the internal volume, or the major part of the internal volume of a flash distillation column is empty, free of internals (typically at least 50%, or 80% or 90% of the internal volume of the column is free of internal elements).

Typically, when a flash distillation column contains internal elements, no other internal elements than those listed below are present.

Starting from the top, the flash distillation column may contain a recirculation device for liquid hydrocarbons from the reflux drum (10), a liquid distribution tray for said recirculated liquid, a minimum layer of packing elements (7f) to help prevent liquid entrainment, a light oil tray (7d) for extracting liquid hydrocarbon positioned in the middle, preferentially in the top third the column, and connected to a recirculation loop for said liquid, preferentially below the extraction level, said recirculation equipped with spray nozzle to spray recirculated liquid, and, in the lower part, and a recirculation loop for heavy hydrocarbons obtained at the bottom of the column, equipped as well with spray nozzle to spray recirculated heavy hydrocarbons.

Said recirculation and spraying helps to control temperature of the column and also concentrates tar in the bottom part of the column.

For avoidance of doubt, a flash distillation column is not an interfacial unit, filled with internal elements designed to increase its surface area, such as packing elements.

Given the efficiency of the tray reflux column in terms of refluxing long chain hydrocarbons to pyrolysis, a simple flash distillation step provides hydrocarbons suitable for use in fuel blendings, such as for example diesel blendings for heavy fractions, or for use as chemical feedstock or heating oil. This has the advantage of reducing the risks of fouling by char and tar, since flash vessels are empty vessels that do not contain internals or at least very few.

Figure 4:
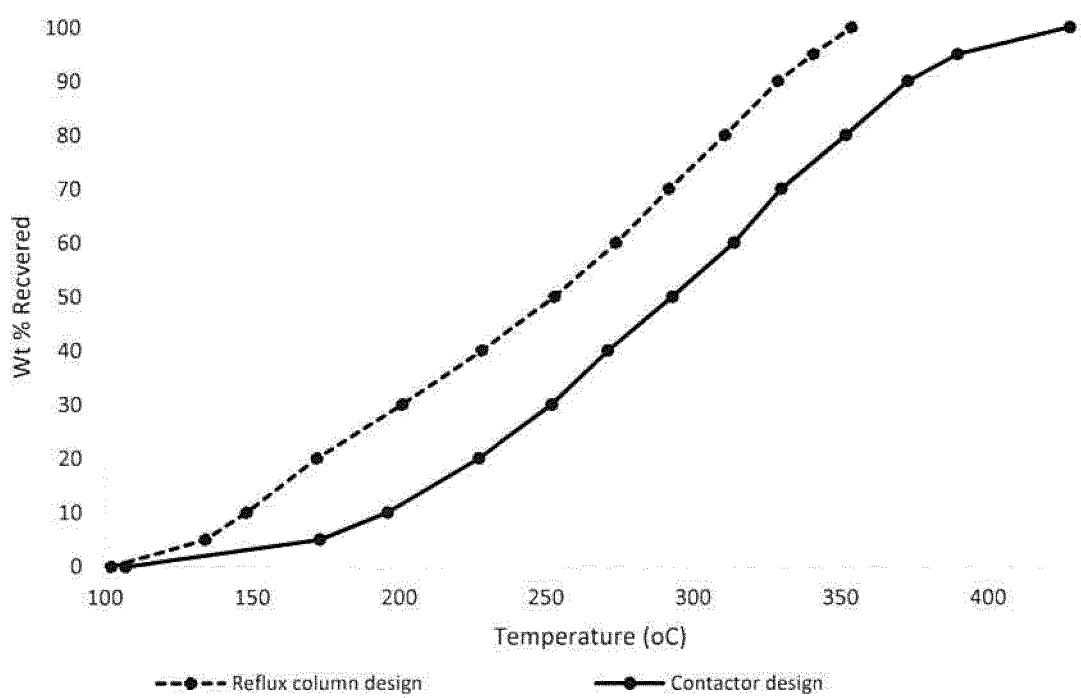
FIG. 4 is a plot diagram of the fuel product boiling point ranges obtained after flash distillation in the process according to the invention (left curve), as compared to those obtained with state of the art processes (right curve).
Figure 5:
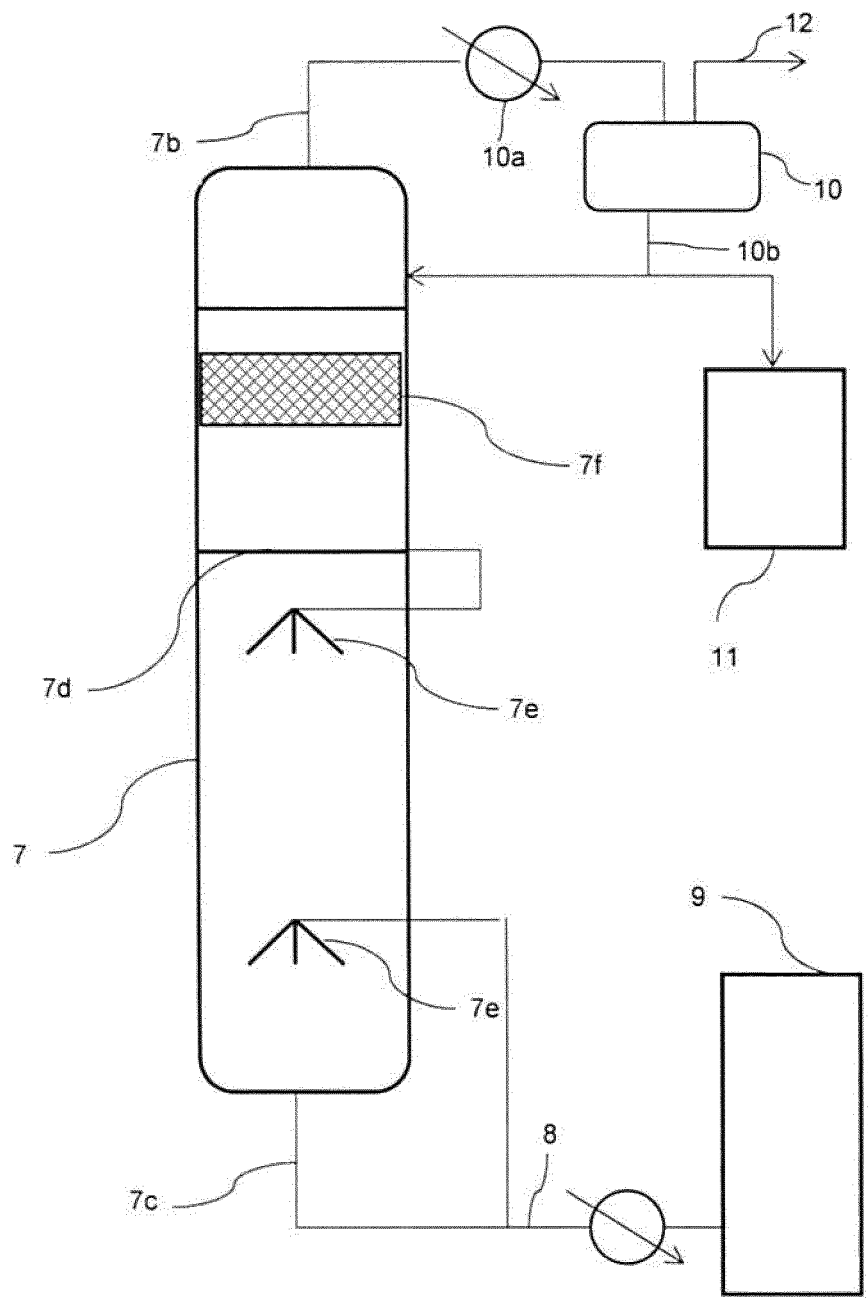
FIG. 5 represents a flash distillation column according to the invention.

FIG. 4 compares properties of products obtained after flash distillation step of the process according to the invention with products obtained after complex atmospheric distillation, in processes using a contactor as described in patent application n°WO2011077419 instead of a tray reflux column according to the invention. One can see that the process according to the invention provides hydrocarbons with lower end boiling point and more favorable boiling points distribution (left curve).

Lighter compounds may further be removed, for example by sending said products to a vacuum distillation step.

Also given the efficiency of the tray reflux column in terms of char scrubbing, the process according to the invention can be run with a minimum of interruption for cleaning and maintenance. Up to 100 batches have been run consecutively without such interruption, as compared to around 30 with state of the art processes, where the installation had to be stopped to remove the column packing internals of the distillation column, that were filled with char.

The availability of the industrial installation, typically treating around 4000 tons of plastic per year, has been improved with the use of a tray reflux column, as compared to contactors or reflux systems of the state of the art, due to the tray design knocking char particles back into the pyrolysis reactor due to the washing of the vapour flow.

Char yield per batch (calculated as the ration between kilograms of char obtained after pyrolysis and kilograms of plastic fed in the pyrolysis chamber) in the pyrolysis increased from 5% on average to an average of 10%, indicating increased retention of char.

The invention claimed is:

1. A process for thermal cracking of a feedstock of plastic materials in an apparatus, the apparatus comprising:
    a mixing and melting device;
    a pyrolysis chamber; and
    a reflux column connected to a gas exit of the pyrolysis chamber, wherein the reflux column comprises an upper extremity and a plurality of crossflow trays, the plurality of crossflow trays including an upper tray disposed above a lower tray, the reflux column comprises a partial condenser disposed in the upper extremity of the reflux column, wherein the plurality of crossflow trays are valve trays, the valve trays having a plurality of valves, each valve of the plurality of valves having a corresponding cap disposed thereupon; and
    wherein the process comprises the steps of melting the feedstock in the mixing and melting device, conveying melted feedstock in the pyrolysis chamber, where said melted feedstock is heated in a substantially oxygen purged environment to convert it into pyrolysis gases, said process further comprising the steps of:
    driving pyrolysis gases from the pyrolysis chamber into the reflux column, returning pyrolysis gases condensed in the reflux column into the pyrolysis chamber, distilling pyrolysis gases exiting the partial condenser of the reflux column, to provide one or more fuel products;
    wherein distilling pyrolysis gases exiting the partial condenser is done by flash distillation in a flash distillation column, the flash distillation column having an upper portion disposed above a lower portion; and
    wherein the flash distillation step comprises partial recirculation of liquid heavy hydrocarbons obtained at the bottom of the flash distillation column in the lower portion of the flash distillation column by spraying said heavy hydrocarbons.

2. The process according to claim 1, wherein the reflux column comprises a demister pad between the upper tray and the partial condenser.

3. The process according to claim 1, wherein the partial condenser of the reflux column is a tube heat exchanger.

4. The process according to claim 1, comprising the step of injecting liquid water or liquid hydrocarbons at the bottom of the reflux column.

5. The process according to claim 1, comprising the step of condensing pyrolysis gases exiting the partial condenser of the reflux column in a condenser before distilling said gases.

6. The process according to claim 1, wherein the flash distillation step comprises condensation of the vapor phase at the head of the flash distillation column and partial recirculation of condensed light hydrocarbons in the upper portion of the flash distillation column.

7. The process according to claim 1, wherein the crossflow trays comprise down comers.

8. The process according to claim 1, wherein the upper tray of the reflux column is a chimney tray.

9. The process according to claim 1, further comprising an extruder configured to heat the feedstock.

10. The process according to claim 9, wherein the extruder is configured to extrude the feedstock into the pyrolysis chamber.

11. The process according to claim 1, comprising a flash distillation column downstream of the partial condenser of the tray reflux column.

12. The process according to claim 11, comprising a condenser positioned between the partial condenser of the tray reflux column and the flash distillation column.

13. The process according to claim 11, wherein the flash distillation column comprises a condenser and a reflux drum at a top end of the flash distillation column, and a recirculation loop for recirculating condensed light hydrocarbons of the reflux drum in the upper part of the flash distillation column.

14. The process according to claim 11, wherein the flash distillation column comprises a recirculation loop for liquid heavy hydrocarbons obtained at the bottom of the flash distillation column, said recirculation loop being equipped with spray nozzles for spraying the liquid in the flash distillation column.

\* \* \* \* \*